Nov. 13, 1923.
J. M. DAVIE
1,473,781
TOOL FOR BORING AND REAMING HOLES IN METAL
Filed May 4, 1921
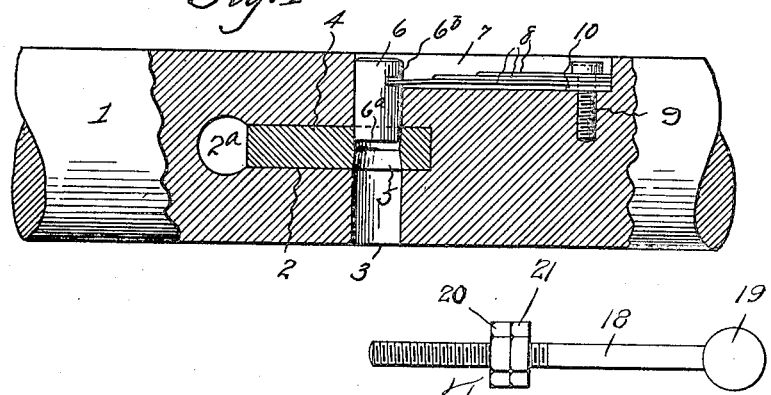
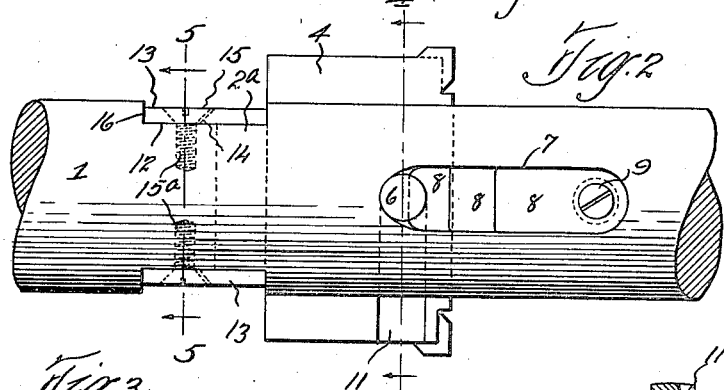
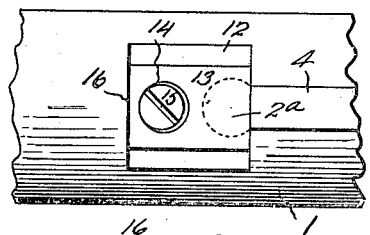
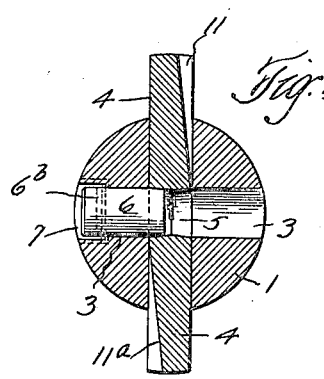
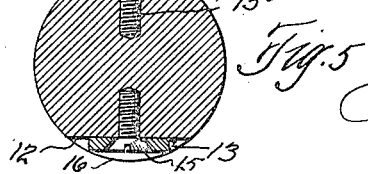

Patented Nov. 13, 1923.

1,473,781

UNITED STATES PATENT OFFICE.

JOHN M. DAVIE, OF EAST CLEVELAND, OHIO, ASSIGNOR TO THE KELLY REAMER COMPANY, OF CLEVELAND, OHIO, A CORPORATION OF OHIO.

TOOL FOR BORING AND REAMING HOLES IN METAL.

Application filed May 4, 1921. Serial No. 466,854.

*To all whom it may concern:*

Be it known that I, JOHN M. DAVIE, a citizen of the United States, residing at East Cleveland, in the county of Cuyahoga and State of Ohio, have invented a certain new and useful Improvement in Tools for Boring and Reaming Holes in Metal, of which the following is a full, clear, and exact description, reference being had to the accompanying drawings.

This invention relates to tools for boring and reaming holes in metal, and more especially to tools of the type that are referred to in the art as line boring and reaming bars, turret lathe bars, etc. In tools ordinarily employed for the above purpose, it is necessary to remove the cutting tools from the bars or holders in order to permit the latter to be inserted into or withdrawn from the jigs or parts on which the tools are being used. This removal of the tools necessitates, in turn, the removal of screws, keys, wedges and other securing means; and this removal becomes a most tedious and time-consuming operation when the securing means are not readily and conveniently accessible.

The general object of the invention is to produce a tool which is free from the objections noted and which is thereby capable of being readily inserted into and removed from the jigs or parts on which it is being used with a corresponding saving in the time of the operator and a corresponding increase in the productive capacity of the tool equipment. A further and more limited object of the invention is to improve the means for mounting and securing the cutting tools within their bars or holders.

I secure the foregoing objects in and through the construction and arrangement of parts shown in the drawings forming part hereof, wherein Fig. 1 represents a sectional plan view of a portion of a bar or holder having my invention embodied therewith; Fig. 2 an elevation of the same; Fig. 3 a detail in plan of the bar, showing the means for taking up the pressure or thrust of the cutting member; Figs. 4 and 5 are sectional details corresponding respectively to the lines 4—4 and 5—5 of Fig. 2 and looking in the direction of the arrows; and Fig. 6 is an elevation of a tool for use in connection with the removal of the cutting member from the bar or holder.

Describing by reference characters the various parts illustrated herein, 1 denotes the holder, which is shown herein and will be referred to hereinafter as a bar. The bar is provided with a slot 2 extending transversely of and across the axis of the same, the said slot being rectangular in cross-section, with the exception of the rear end $2^a$ which is partly circular in section being formed by a boring tool.

Intersecting the slot 2 and the axis of the bar, and at right angles to the slot, is a bore 3. Mounted in the slot 2 is a cutting member 4, the said member (with the exception of the details to be mentioned hereinafter) being of standard construction. The cutting member is provided with a bore 5 which, when the cutter is properly positioned within its slot in the bar, registers with the bore 3. The bore 5 tapers from each end thereby providing a pair of frusto-conical seats, each of which is adapted to receive a locking member. This locking member is shown as a pin, as indicated at 6, and is cylindrical throughout the major portion of its length and its cylindrical portion is of a diameter to provide a sliding fit within the bore 3. Its inner end, however, is tapered, as indicated at $6^a$, whereby it conforms to either of the tapered seats in the bore 5 in the cutting-member 4.

The bar is provided with a recess 7 which includes the portion of the bore 3 in which the pin 6 is mounted. Within this recess there is a resilient controlling member for the pin 6. This resilient member is of the flat spring type and comprises a plurality of spring plates 8 which are of progressively increasing length from the top plate to the bottom plate and the free end of the bottom or longest of said plates entering a notch $6^b$ in the pin 6. The said plates are mounted in the end of the slot 7 which is opposite the bore 3 by means of a screw 9 extending through all of the plates and through a washer 10, being threaded into the body of the bar. The washer spaces the longest or bottom leaf of the spring assembly from the bottom of the slot 7, thereby enabling the spring assembly to control (in part at least) the movements of the pin 6. As shown in the drawing, the slot $6^b$ is so arranged with reference to the tapered end of the pin 6 and the tapered seat for the same within the bore 5, and the spring member is so arranged and located, that it yieldingly presses the said pin to its seat. When the cutter 4 is removed from the slot 2, the spring will rest at its free end against the bottom of the slot 7, being under deflection when the said pin is seated in the bore 5, whereby the said spring tends to hold the pin firmly seated at all times within the said bore.

The cutting member is provided in each of its lateral faces with a groove or recess of a width capable of receiving the end of the locking pin 6, the bottom 11ª of each groove being inclined from the outer edge of the cutting member to the bore 5, the depth of such grooves at the outer edges of the cutter being sufficient to enable each to receive the pin 6 therewithin, when the latter is in its extreme innermost position, due to the action of the spring controlling member. The purpose of these grooves will be explained hereinafter.

The bar 1 is provided with a pair of opposed seats 12, the said seats being formed on opposite sides of the bar and being parallel with each other, each seat covering the enlarged or circular portion 2ª of the bore 2. 13 denotes a plate, each having an opening 14 therethrough, each opening being tapered from the outer surface of its plate to the inner surface thereof. Mounted in each opening 14 is the head 15 of a screw which is threaded into the bar 1, the head of each screw being also tapered, the openings 14 being of greater width in the direction of the axis of the bar than the width or diameter of the cooperating screw head, clearance thereby being produced between the portion of the screw head which is presented toward the cutter member and the surface 14 therebeneath. With this arrangement, by setting up on the screws 15ª, the plates 13 will be clamped to the bar and simultaneously forced against the shoulders 16 formed at the ends of the seats 12 which are remote from the cutting member. When the parts are in this position, the ends of the cutting member which are adjacent to the plates 13 will be in engagement with said plates; and the plates, which may be of hardened material, serve to take the cutting pressure or thrust exerted upon and by the cutting member and transmit the same to the bar through the said shoulders and without any thrust upon the screws themselves. Furthermore, the use of the plates 13 in this manner makes it possible to form, in a particularly simple and economical manner, the necessary opening or slot 2 for the cutting member and also to provide means whereby the said member may be removed and replaced.

Assuming that the bar has been suitably mounted for operation, with the locking pin and spring controlling member in place, the cutting member 4 will be inserted into its slot 2, the outer end of the slot 11 registering with the part of the bore 3 containing the pin 6. The depth of the outer end of the slot 11 is such that its tapered bottom will pass under the inner end of the pin 6 when the entering side of said member reaches the bore 3. Further movement of the said member in the slot 2 will move the pin 6 outwardly in the bore 3 against the resistance of the spring 8 until the inner tapered end of the pin registers with the central bore 5 in the cutter, at which time the spring 8 will cause the pin to be snapped into locking engagement with the bore 5, the pin serving to centralize and hold the cutting-member in the bar. The bar 1 may then be rotated and fed in the usual manner to secure the reaming or boring operation.

In Fig. 6 there is shown a simple and convenient tool for facilitating the removal of the cutting member from the bar 1. This tool comprises a stem 18 having a head 19 thereon and provided with nuts 20 and 21, one of which (20) serves as a stop and the other (21) as a locking means for the former nut.

Should it be desired to remove the cutting-member the stem 18 will be inserted into the lower end of the bore 3, (the part remote from the pin 6) and the said pin will be pressed outwardly in the bore 3 by the said stem until its inner end clears the said member. The nuts 20 and 21 will have been adjusted so that, when the nut 20 engages the bar, the inner end of the pin will have cleared the seat in the cutting member. The cutting member may then be backed out a sufficient distance to enable the face adjacent to the inner end of the pin to be brought beneath the latter. The push-out tool may then be removed from the bores 3 and 5 and the cutting member withdrawn.

Having thus described my invention, what I claim is:—

1. The combination of a bar having a cross slot thru the same, a cross bore thru the bar and intersecting the slot, a cutter in the slot, having a recess, and a spring pin in the bore and engageable in said recess.

2. In a tool of the character described, the combination of a bar having a slot and a bore extending inwardly from the outer surface of said bar and meeting said slot, a cutting member mounted in said slot, a locking member reciprocably mounted in said bore, and a flat spring secured to the outside of the said bar and connected with the locking member for yieldingly holding the latter in locking relation to the cutting member.

3. In a tool of the character described, the combination of a bar having a slot and a bore extending transversely therethrough and intersecting the said slot, a cutting member reciprocably mounted in said slot and having an opening extending therethrough, a locking member mounted in said bore and having a tapered end to cooperate with said opening, and means for controlling the locking member and for holding it in operative relation to said cutting member.

4. The combination of a slotted bar having external seats with a shoulder adjacent the ends of the slot, a cutter in the slot, and plates secured on the seats and abutting at one end against the shoulder and at the other end against the rear edge of the cutter.

5. In a tool of the character described, the combination of a bar having a slot and a bore meeting said slot, a cutting member reciprocably mounted in said slot and having an aperture therein adapted to register with said bore, a locking pin reciprocably mounted in the said bore, the bar having a seat extending from and including the bore thereof, a flat spring secured at one end in said seat and spaced from the bottom thereof, and a connection between the free end of said spring and the said pin.

6. In a tool of the character described, the combination of a bar having a slot therein and a bore meeting said slot, a cutting member reciprocably mounted in said slot and having a seating portion adapted to register with said bore, a locking member reciprocably mounted in the said bore, and adapted to engage said seating portion, a flat spring supported by said bar, and a connection between the said spring and the said locking member.

7. In a tool of the character described, the combination of a bar having a slot and a bore meeting said slot, a cutting member reciprocably mounted in said slot, a locking member reciprocably mounted in said bore and adapted to engage the said cutting member thereby to hold the same against movement, and a flat spring secured at one end to the said bar and having its opposite end connected to said locking member.

8. In a tool of the character described, the combination of a bar having a slot and a bore extending transversely therethrough and intersecting said slot, a cutting member reciprocably mounted in said slot and having a frusto conical opening extending from each side thereof and adapted to register with said bore, each side having a groove formed therein, the bottom of each of said grooves being tapered outwardly toward its respective opening, a locking member mounted in said bore and having a frusto conical end adapted to cooperate with one of said openings, and means yieldingly pressing said locking member inwardly in its bore.

9. A tool of the character described comprising a bar having a slot extending therethrough, a cutter mounted in said slot and terminating short of the rear end thereof, and plates secured to opposite sides of said bar and each covering the rear end of said slot and adapted to abut against the rear end of the cutter, and a shoulder on said bar cooperating with the seat end of each plate.

10. In a tool of the character described, the combination of a bar having a slot therethrough, a cutter mounted in said slot, a pair of plates secured on opposite sides of the said bar at the rear and adapted to abut against said cutter, each of said plates having an elongated slot therethrough, a screw in each slot and mounted in said bar, and a shoulder on said bar for the rear end of each plate.

In testimony whereof, I hereunto affix my signature.

JOHN M. DAVIE.